Patented Sept. 29, 1953

2,653,940

UNITED STATES PATENT OFFICE 2,653,940

PROCESS FOR PREPARING 4-QUINOLYL SECONDARY AMINES

William S. Johnson, Madison, Wis.

No Drawing. Application January 27, 1951,
Serial No. 208,237

9 Claims. (Cl. 260—288)

This invention relates to a process for preparing 4-quinolyl secondary amines which comprises condensing a 4-keto-1,2,3,4-tetrahydroquinoline with a primary amine.

The 4-keto-1,2,3,4-tetrahydroquinoline used in the new process can be unsubstituted or substituted, and, when substituted, the nature of the substituents is not critical aside from the necessity for a hydrogen atom in the 1-position to permit aromatization, and the absence of substituents reactive with primary amines. Those substituents reactive with primary amines are well-known to those skilled in the art, and include carboxy, carbalkoxy and acyl radicals.

The nature of the primary amine is immaterial, provided the amino group is basic in character.

The chemical reactions involved in the new process are believed to take place in the following manner, using as exemplary starting material the unsubstituted 4-keto-1,2,3,4-tetrahydroquinoline:

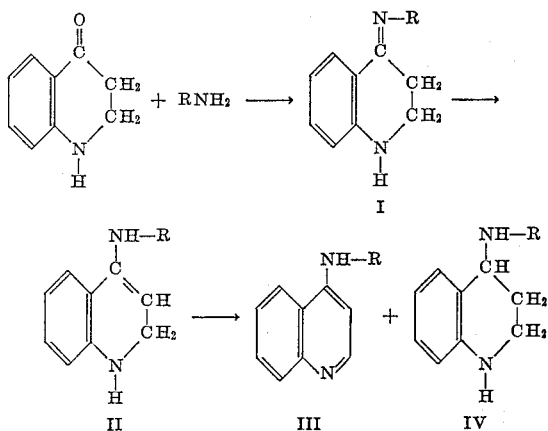

The primary amine first condenses with the 4-keto-1,2,3,4-tetrahydroquinoline in the normal manner to form a Schiff base (I). The Schiff base, probably by way of the tautomeric dihydroquinoline (II), then disproportionates to produce equivalent amounts of the desired fully aromatic 4-quinolyl secondary amine (III) and the corresponding tetrahydroquinoline (IV).

This mechanism was essentially established by thorough investigation of the product derived from condensation of 1-keto-1,2,3,4-tetrahydroquinoline and beta-phenylethylamine. After removal of all of the 4-(beta-phenylethylamino)-quinoline in the form of the picrate from the reaction mixture, the residual fraction was converted to the acetyl derivative, which after two fractional evaporative distillations had the correct carbon and hydrogen content for the diacetyl derivative of 4-(beta-phenylethylamino)-1,2,3,4-tetrahydroquinoline. The composition of the residual fraction was further substantiated by the fact that its thermal decomposition products were found to be 3,4-dihydroquinoline and beta-phenylethylamine, viz.:

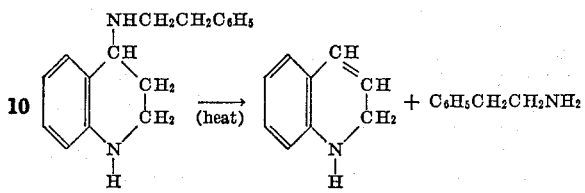

Theoretically, no more than 50% of the 4-keto-tetrahydroquinoline can be converted to the desired 4-quinolyl secondary amine (III), and this has been found to be the case in reactions of short duration or in the absence of available oxygen. However, the yield may be substantially increased, to as high as 80–90% in some cases, by prolonged heating in the presence of air or other oxidizing agent. This can be interpreted as a direct oxidation of the dihydroquinoline (II), which reaction then competes with the disproportionation reaction to produce larger amounts of III than of IV.

A preferred aspect of the invention comprises the synthesis of 4-quinolyl compounds of the type generally useful as chemotherapeutic agents. The primary amines useful for this purpose are diamines having the general formula, $$H_2N—A—N=B$$

wherein A is a hydrocarbon bridge having from two to about ten carbon atoms or such a hydrocarbon bridge substituted by a hydroxyl group; and —N=B represents a non-aromatic tertiary amino group, including di-lower-alkylamino, di-(hydroxy-lower-alkylamino), (hydroxy-lower-alkyl)-lower-alkylamino, piperidino, morpholino, and pyrrolidino radicals. Following are examples of diamines which are particularly useful as starting materials in the new process:

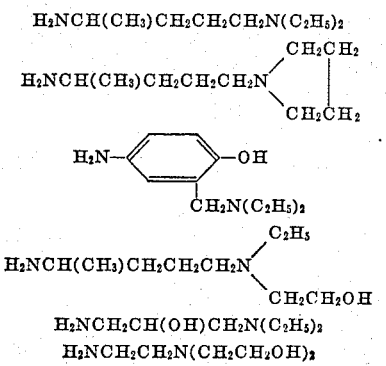

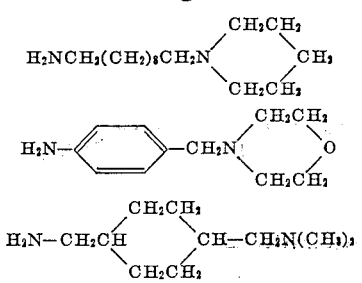

The nature of the hydrocarbon bridge, A, is immaterial and can be of the aromatic, aliphatic, mixed aromatic-aliphatic or cycloaliphatic type. The lower-alkyl groups which can be present in the tertiary amino group, N=B, preferably contain less than about six carbon atoms each.

In the preparation of preferred species of 4-quinolyl secondary amines, the 4-keto-1,2,3,4-tetrahydroquinoline can be unsubstituted, or it can be substituted on the carbon atoms of the pyridine ring (position 2 or 3) by lower-alkyl groups and/or in the benzene ring (position 5, 6, 7 or 8) by one or more stable groups including halogen, lower-alkoxy, lower-alkyl and trifluoromethyl groups. The lower-alkyl and -alkoxy groups preferably each contain less than about six carbon atoms. These substituents form a class which are known to produce quinoline derivatives which have enhanced activity as chemotherapeutic agents. The 4-keto-1,2,3,4-tetrahydroquinoline can be represented by the formula

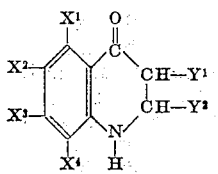

wherein $Y^1$ and $Y^2$ are selected from the group consisting of hydrogen and lower-alkyl groups, and $X^1$, $X^2$, $X^3$ and $X^4$ are selected from the group consisting of hydrogen, halogen, trifluoromethyl, lower-alkoxy and lower-alkyl groups. A particularly valuable starting material is 7-chloro-4-keto-1,2,3,4-tetrahydroquinoline which is an intermediate in the synthesis by the present invention of chloroquine, an important synthetic antimalarial agent. Other valuable substituted 4-keto-1,2,3,4-tetrahydroquinolines include: 3-methyl-4-keto-1,2,3,4-tetrahydroquinoline; 3-methyl-7-chloro-4-keto-1,2,3,4-tetrahydroquinoline; 6-methoxy-7-chloro-4-keto-1,2,3,4-tetrahydroquinoline; 7-chloro-3-methyl-4-keto-1,2,3,4-tetrahydroquinoline; 7-trifluoromethyl-4-keto-1,2,3,4-tetrahydroquinoline; 1,2-dimethyl-7-bromo-4-keto-1,2,3,4-tetrahydroquinoline; 6,7,8-trichloro-4-keto-1,2,3,4-tetrahydroquinoline; and the like.

The intermediate 4-keto-1,2,3,4-tetrahydroquinolines just described can be prepared by the method disclosed by W. S. Johnson et al., J. Am. Chem. Soc. 71, 1901–5 (1949). The appropriate choice of starting materials will lead to any desired substituted 4-keto-1,2,3,4-tetrahydroquinoline.

The condensation of the 4-keto-1,2,3,4-tetrahydroquinoline with the primary amine can be carried out by heating together approximately equimolar quantities of the reactants. An excess of the primary amine, up to two equivalents or slightly more, can be used to insure completion of the reaction, but a very large excess should be avoided to prevent difficulties in separation of the excess from the desired final product. The temperature used should be between about 70° C. and 200° C. The reaction can be performed by heating the reactants alone or in an inert organic solvent such as benzene, toluene, xylene, phenol, nitrobenzene, ethylene glycol, pyridine and the like. When a solvent is used, the concentration of the reactants is such that there is preferably not less than about 0.05 gram of ketone per milliliter of solvent. The reaction proceeds in the absence of air or other oxidizing agents, but under these conditions less than 50% yield of the desired product will be obtained. It is preferred, therefore, to carry out the process in contact with air and/or other oxidizing agents or dehydrogenating agents. Palladium-on-carbon and nitrobenzene are particularly useful for this purpose. Optionally, small amounts of an inorganic salt, such as ammonium chloride, zinc chloride or sodium iodide, may also be added for their possible catalytic influence, but it was found that the presence or absence of such salts made little or no difference in the necessary duration of the reaction or the yield of final product.

This new process is particularly adapted to the preparation of the antimalarial, chloroquine. 7-chloro-4-keto-1,2,3,4-tetrahydroquinoline and 2-amino-5-diethylaminopentane were condensed in phenol solution in the presence of nitrobenzene according to the present invention to give chloroquine, which was isolated as the diphosphate in as much as 88.7% yield. This step is the last of six steps in the synthesis of chloroquine from m-chloroaniline and methyl acrylate. Using my present invention the overall synthesis can be effected in about 29% yield. The earlier steps of this synthesis are described by Johnson et al., J. Am. Chem. Soc. 71, 1901–5 (1949).

The following examples will further illustrate my invention, but should not be construed as limitative.

EXAMPLE 1

Preparation of 4-(beta-phenylethylamino) quinoline

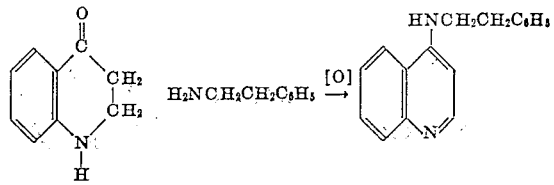

A mixture of 3.012 g. (0.0204 mole) of 4-keto-1,2,3,4-tetrahydroquinoline, 2.47 g. of freshly distilled beta-phenylethylamine, 21 mg. of ammonium chloride and 30 ml. of dry benzene was refluxed for seven and one-half hours in an apparatus equipped with a water separator. The amount of water removed was 0.3–0.4 ml. (0.37 ml. is theory). By distillation through the water-separator 26 ml. of benzene was removed and the solution was allowed to cool. Yellow rods crystallized from the concentrated reaction mixture, and after filtering and drying the precipitate to constant weight, 1,388 g. of 4-(beta-phenylethylamino) quinoline, M. P. 148–154° C. was obtained. Repeated recrystallization of the product from benzene gave fine colorless rods, M. P. 159–159.5° C.

Anal. calcd. for $C_{17}H_{16}N_2$: C, 82.22; H, 6.50. Found: C, 81.95; H, 6.17.

The melting point of the above material was undepressed on admixture with 4-(beta-phenylethylamino) quinoline, M. P. 159–160° C., prepared from 4-chloroquinoline and beta-phenylethylamine according to the general method of Surrey and Hammer, J. Am. Chem. Soc. 68 113 (1946).

The picrate, prepared in and repeatedly recrystallized from alcohol, was obtained as fine yellow needles, M. P. 198–199° C., presoftening at 184–186° C.

Anal. calcd. for $C_{23}H_{19}N_5O_7$: C, 57.86; H, 4.01. Found: C, 57.89; H, 3.97.

The oil remaining after concentrating the mother liquors continued to deposit crystalline material over a period of several weeks. Successive crops, 0.273 g., M. P. 124–144° C., 0.182 g., M. P. 143–153° C., 0.285 g., M. P. 154–157° C., and 0.321 g., M. P. 135–147° C., were obtained bringing the total crude yield of 4-(beta-phenylethylamino)quinoline to 2.449 g. (48.4% of the theory).

EXAMPLE 2

A mixture of 1.000 g. (0.0068 mole) of 4-keto-1,2,3,4-tetrahydroquinoline, 0.93 g. (0.0077 mole) of freshly distilled beta-phenylethylamine, 10 mg. of ammonium chloride and 12 ml. of toluene was refluxed in a system containing a water separator for five hours. Approximately two-thirds of the toluene was then distilled off through the separator, and the original volume was restored with xylene. After adding 0.10 g. of palladium-charcoal (30%) (Linstead and Thomas, J. Chem. Soc. 1940, 1127) to the reaction mixture, refluxing was continued for twelve hours with the internal temperature of the mixture at 128° C. The palladium-charcoal was filtered off and washed with hot benzene, and the wash liquids were combined with the xylene filtrate. When cool, the filtrate deposited a white cake of solid material, which, when filtered and dried to constant weight, amounted to 1.002 g. of 4-(beta-phenylethylamino)quinoline, M. P. 156.5–159° C. A second crop was obtained amounting to 0.080 g., M. P. 151–155.5° C., with slight softening in the range 140–145° C.; total yield 64.1%.

EXAMPLE 3

Preparation of 4-(4'-diethylamino-1'-methylbutylamino) quinoline

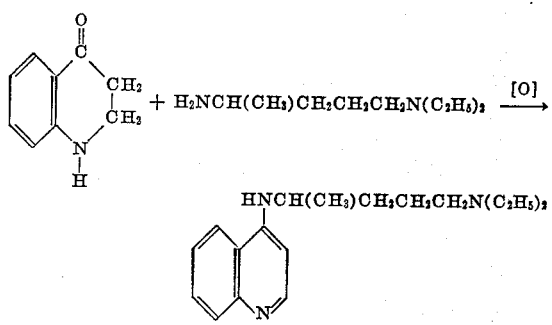

(A) *By air oxidation.*—A mixture of 0.250 g. of 4-keto-1,2,3,4-tetrahydroquinoline, 0.412 g. of redistilled 5 - diethylamino - 2 - aminopentane ($n_D^{25}$=1.4406), 0.375 g. of phenol and 2 mg. of sodium iodide in a flask equipped with an air condenser protected by a soda-lime tube was heated by an oil bath at 150–153° C. for seventeen hours. After cooling, the solution was treated with concentrated potassium hydroxide solution and was extracted with three portions of ether. The ether solutions were then washed with two portions of water, and extracted with three portions of 1 N hydrochloric acid. The resulting acidic solution was neutralized with saturated sodium acetate solution, and then was extracted with two small portions of ether, which were rejected, and the solution was then made basic with concentrated potassium hydroxide solution. The free base was extracted with ether, the extracts were washed with water and saturated sodium chloride solution and dried over anhydrous potassium carbonate. A brown solid, M. P. 62–72° C. with softening at 56° C., amounting to 0.431 g. (89.1%), was obtained by concentrating the ether solution and drying to constant weight in a vacuum desiccator. This base was converted to the diphosphate in methanol solution according to the method of Surrey and Hammer, loc. cit. The diphosphate of 4-(4'-diethylamino-1'-methylbutylamino)quinoline thus obtained amounted to 0.627 g. (76.8%) of nearly colorless microcrystalline solid, M. P. 214.5–216.5 (M. P. taken in vacuum, inserted at 180° C.).

Anal. calcd. for $C_{18}H_{27}N_3.(H_3PO_4)_2.(H_2O)$: C, 43.28; H, 7.06. Found: C, 42.80; H, 7.29.

A mixed melting point determination showed no depression with authentic material, M. P. 213.5–214° C., prepared from 4-chloroquinoline and 5-diethylamino-2-aminopentane by the method of Steck, Holland and Hallock, J. Am. Chem. Soc. 68, 129 (1946).

In another run, conducted in the same manner as above, a mixture of 0.200 g. of 4-keto-1,2,3,4-tetrahydroquinoline, 0.330 g. of 5-diethylamino-2-aminopentane, 0.30 g. of phenol and 2 mg. of sodium iodide was heated in an oil bath at 150° C. for sixteen and one-half hours. The reaction mixture was worked up as described above. The crude free base amounted to 0.302 g. (78%) and was a tan solid, M. P. 68–76° C. with softening at 60° C. It was converted to 0.429 g. (65.8%) of colorless diphosphate, M. P. 213–216° C. (in vacuum). The latter was converted back to the free base, giving 4-(4'-diethylamino-1'-methylbutylamino)quinoline, M. P. 75.5–78° C. Upon admixture with an authentic sample, M. P. 76–78.5° C., prepared from 4-chloroquinoline and 5-diethylamino-2-aminopentane by the method of Steck et al., loc. cit., the M. P. was 76–78.2° C.

EXAMPLE 4

Preparation of 4 - (4' - diethylamino-1'-methylbutylamino) quinoline. (B) *By use of nitrobenzene as the oxidizing agent*

A mixture of 0.500 g. (0.0034 mole) of 4-keto-1,2,3,4-tetrahydroquinoline, 0.825 g. of 5-diethylamino-2-aminopentane, 0.50 g. of phenol and 0.168 g. of nitrobenzene was heated in an oil bath at 150–156° C. for seven and one-quarter hours. The dark brown mixture was worked up as described in Example 3 except that the step involving neutralization with sodium acetate was omitted, and the acidic extract was carefully washed three times with ether to remove any unreacted nitrobenzene. The crude free base amounted to 1.069 g. of brown sticky solid which was not obtained free of solvent. The diphosphate was prepared by dissolving the crude base in 7 ml. of methanol and adding 3 ml. of solution containing 1 g. of phosphoric acid for 3 ml. of methanol. After standing for one day, the resulting copious precipitate was filtered off and dried to constant weight in a vacuum desiccator, giving 1.243 g. (76.1%) of the diphosphate of 4-(4'-diethylamino-1'-methylbutylamino)quinoline, M. P. 215–216.5° C. (in vacuum).

In another run, conducted exactly like the above except that the phenol was omitted, the amount of nitrobenzene was increased to 0.90 g., 1.036 g. of the crude dark brown, semi-solid free base was obtained. This was converted to 1.257 g. (76.8%) of the diphosphate of 4-(4'-diethylamino-1'-methylbutylamino)quinoline, M. P. 214–216° C. (in vacuum).

EXAMPLE 5

A mixture of 1.00 g. of 4-keto-1,2,3,4-tetrahydroquinoline, 1.65 g. of redistilled 5-diethylamino-2-aminopentane, 4 ml. of xylene and 2 mg. of ammonium chloride was refluxed for fifteen hours. The reaction mixture was worked up as described in Example 3 to give 1.98 g. (60.5%) of the diphosphate of 4-(4'-diethylamino - 1' - methylbutylamino)quinoline, M. P. 213–215° C., with softening at 210° C. (in vacuum).

EXAMPLE 6

*Preparation of 4 - (4'-diethylamino-1'-methylbutylamino)-7-chloroquinoline (chloroquine)*

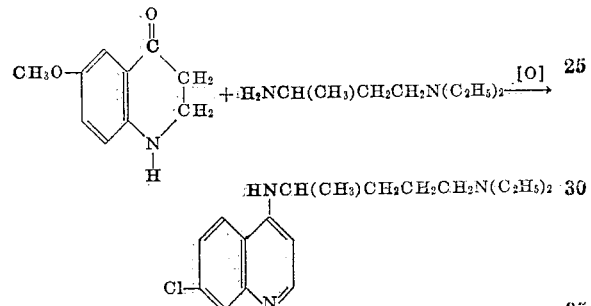

(A) *By air oxidation.*—A mixture of 0.100 g. of recrystallized 4-keto-7-chloro-1,2,3,4-tetrahydroquinoline, M. P. 130–132° C., 0.165 g. of 5-diethylamino-2-aminopentane, 0.15 g. of phenol and 1.5 mg. of sodium iodide was heated in an oil bath at 154° C. for nine and one-quarter hours. The reaction mixture was worked up by the method described in Example 3. The crude free base was obtained as a tan solid, 0.163 g. (92.5%), M. P. 68–84° C. with softening at 65° C. The latter was converted to the diphosphate, giving 0.235 g. (82.7%) of the diphosphate of 4-(4'-diethylamino - 1' - methylbutylamino) - 7 - chloroquinoline, M. P. 187.5–196° C. with softening at 184° C. The free base, regenerated from the salt by dissolving in water, adding potassium hydroxide and extracting with ether, was obtained as 0.137 g. (77.8%) of white to cream-colored solid, M. P. 86–89° C., which was undepressed on admixture with an authentic sample of chloroquine, M. P. 87.2–89° C., prepared by the method of Surrey et al., loc. cit.

In another run, omitting sodium iodide from the reaction mixture, 0.100 g. of crude 4-keto-7-chloro-1,2,3,4-tetrahydroquinoline, M. P. 129–131.5° C. with softening at 124° C., 0.165 g. of 5-diethylamino-2-aminopentane and 0.15 g. of phenol were heated in an oil bath for six hours and ten minutes. The crude free base, obtained as a dark brown oil, was converted to 0.192 g. (67.6%) of light cream-colored diphosphate of 4 - (4' - diethylamino - 1' - methylbutylamino)- 7-chloroquinoline, M. P. 185–195° C.

EXAMPLE 7

*Preparation of 4-(4'-diethylamino-1'-methylbutylamino)-7-chloroquinoline*

(B) *By use of nitrobenzene as the oxidizing agent.*—A mixture of 0.200 g. (0.0011 mole) of recrystallized 7 - chloro - 4 - keto - 1,2,3,4-tetrahydroquinoline, M. P. 131.5–133° C., 0.33 g. of 5-diethylamino-2-aminopentane, 0.30 g. of phenol, and 0.114 g. (0.00092 mole) of nitrobenzene was heated in an oil bath at 155–160° C. for ten and one-quarter hours. The reaction mixture was worked up by the method described in Example 3. The crude free base was treated with methanolic phosphoric acid to give 0.434 g. (76.4%) of the diphosphate of 4-(4'-diethylamino-1'-methylbutylamino) - 7 - chloroquinoline as yellow prisms, M. P. 185.5–192° C. The free base, obtained by neutralization of the phosphate, amounted to 0.250 g. (71%) of light cream-solid, M. P. 85–87.5 C., undepressed by admixture with a sample of authentic chloroquine.

In another run, conducted like the previous run, except that the heating period was decreased to seven and one-quarter hours, 0.200 g. of the recrystallized 7-chloro-4-keto-1,2,3,4-tetrahydroquinoline was converted to 0.504 g. (88.7%) of light yellow chloroquine diphosphate, M. P. 184–192° C.

EXAMPLE 8

A mixture of 0.500 g. of 4-keto-7-chloro-1,2,3,4-tetrahydroquinoline, M. P. 132.4–133.7° C., 0.475 g. of 5-diethylamino-2-aminopentane, 25 ml. of toluene, 18 mg. of ammonium chloride and about 0.1 g. of palladium-charcoal (30%) catalyst was refluxed for fifteen hours. The reaction mixture was worked up by the method described in Example 3 to give 0.286 g. of chloroquine diphosphate, M. P. 187–217° C.

EXAMPLE 9

A mixture of 0.100 g. of 4-keto-7-chloro-1,2,3,4-tetrahydroquinoline, M. P. 129–131.5° C., 0.165 g. of 5-diethyl-2-aminopentane, 0.15 g. of phenol and 1.5 mg. of sodium iodide was heated at 150° C. for fourteen and one-half hours in a nitrogen atmosphere. The reaction mixture was worked up by the method described in Example 3 to give 0.115 g. (40.5%) of chloroquine diphosphate, M. P. 188–196° C.

EXAMPLE 10

A mixture of 0.100 g. of 4-keto-7-chloro-1,2,3,4-tetrahydroquinoline, M. P. 129–131.5° C., 0.165 g. of 5-diethylamino-2-aminopentane and 0.15 g. of ethylene glycol was heated at 150° C. for six hours. The reaction mixture was worked up in the usual way to give 0.165 g. (58.2%) of chloroquine diphosphate, M. P. 187–200° C.

EXAMPLE 11

*Preparation of 4-(4'-diethylamino-1'-methylbutylamino)-6-methoxyquinoline*

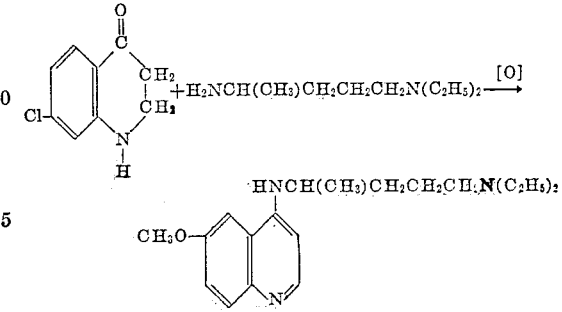

A mixture of 0.100 g. of 4-keto-6-methoxy-1,2,3,4 - tetrahydroquinoline, 0.165 g. of 5 - diethylamino-2-aminopentane, and 0.15 g. of phenol was heated in an oil bath at 144° C. for nine hours. The reaction mixture was worked up by the method described in Example 3, except that the sodium acetate neutralization was omitted. The crude free base was purified by evaporative distillation rather than by preparation of the diphosphate since this salt could not be made to crystallize from alcoholic solution. The fraction of free base distilling at 175–180° C. (0.10 mm.) was collected, giving 151 mg. (84.7%) of 4-(4'-diethylamino - 1' - methylbutylamino) - 6 - methoxyquinoline, M. P. 125–128° C., undepressed on admixture with an authentic sample, M. P. 126.5–129° C., prepared by the method of Surrey et al., loc. cit.

In another run, conducted like the above except that the temperature was maintained at 150–156° C., and the heating period was extended to ten and one-quarter hours, 0.100 g. of 4-keto-6-methoxy-1,2,3,4-tetrahydroquinoline was converted to 0.152 g. of the crude free base, M. P. 83–110° C. Evaporative distillation at 170–173° C. (0.015 mm.) gave 0.115 g. (64.5%) of 4-(4'-diethylamino - 1' - methylbutylamino) - 6 - methoxyquinoline, M. P. 90–116° C.

By the methods described in the foregoing examples the following compounds can be prepared:

4 - (4' - pyrrolidino - 1' - methylbutylamino) - 7-chloroquinoline, prepared by heating 7-chloro-4-keto-1,2,3,4-tetrahydroquinoline with 5-pyrrolidino-2-aminopentane.

4 - (3' - diethylaminomethyl - 4' - hydroxyphenylamino) - 7 - chloroquinoline, prepared by heating 7-chloro-4-keto-1,2,3,4-tetrahydroquinoline with 3 - diethylaminomethyl - 4 - hydroxyaniline.

4 - [4' - (beta - hydroxyethyl)ethylamino-1' - methylbutylamino) - 7 - chloroquinoline, prepared by heating 7 - chloro - 4 - keto - 1,2,3,4-tetrahydroquinoline with 5-beta-hydroxyethyl)-ethylamino-2-aminopentane.

4 - (3' - diethylamino - 2 - hydroxypropyl-amino) -7-chloroquinoline, prepared by heating 7-chloro-4-keto-1,2,3,4-tetrahydroquinoline with 3-diethylamino-2-hydroxypropylamine.

4 - (4' - diethylamino - 1' - methylbutyl-amino) -3-methyl-7-chloroquinoline, prepared by heating 3 - methyl - 4 - keto - 7 - chloro - 1,2,3,4-tetrahydroquinoline with 5-diethylamino-2-aminopentane.

4 - (4' - diethylamino - 1' - methylbutylamino) - 7 - trifluoromethylquinoline, prepared by heating 7-trifluoromethyl-4-keto-1,2,3,4-tetrahydroquinoline with 5 - diethylamino - 2 - aminopentane.

I claim:

1. The process for preparing 4-quinolyl secondary amines which comprises heating at a temperature between about 70° C. and 200° C. a 4-keto-1,2,3,4-tetrahydroquinoline, devoid of substituents reactive with primary amino groups and bearing a hydrogen atom in the 1-position, with at least about one equivalent of a basic primary amine in which the amino group is attached directly to a carbon atom.

2. The process which comprises heating at a temperature between about 70° C. and 200° C. a 4 - keto - 1,2,3,4 - tetrahydroquinoline having the formula

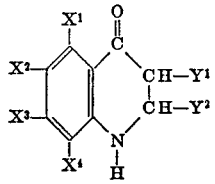

wherein $Y^1$ and $Y^2$ are selected from the group consisting of hydrogen and lower-alkyl groups, and $X^1$, $X^2$, $X^3$ and $X^4$ are selected from the group consisting of hydrogen, halogen, trifluoromethyl, lower-alkoxy and lower-alkyl groups, with at least one equivalent of a diamine having the formula $H_2N-A-N=B$ wherein A is a member of the group consisting of divalent hydrocarbon radicals having 2–10 carbon atoms and divalent hydrocarbon radicals having 2–10 carbon atoms substituted by a hydroxyl group; and $N=B$ is a member of the group consisting of di-lower - alkylamino, di - (hydroxy - lower - alkylamino), (hydroxy - lower - alkyl) - lower - alkylamino, piperidino, morpholino and pyrrolidino radicals.

3. The process for preparing a compound having the formula $$Q-NH-A-N=B$$

wherein Q is the 7-chloro-4-quinolyl radical, A is a lower-alkylene bridge and $N=B$ is a di-lower-alkylamino radical, which comprises heating at a temperature between about 70° C. and 200° C. 4-keto-7-chloro-1,2,3,4-tetrahydroquinoline with at least one equivalent of a diamine having the formula $H_2N-A-N=B$.

4. The process according to claim 3 wherein the reaction is carried out in the presence of an oxidizing agent.

5. The process according to claim 4 wherein the oxidizing agent is nitrobenzene.

6. The process for preparing 4-(4'-diethylamino-1'-methylbutylamino) -7- chloroquinoline which comprises heating at a temperature between about 70° C. and 200° C. 4-keto-7-chloro-1,2,3,4-tetrahydroquinoline with at least about one equivalent of 5-diethylamino-2-aminopentane.

7. The process for preparing 4-(4'-diethylamino-1'-methylbutylamino) -7- chloroquinoline which comprises heating at a temperature between about 70° C. and 200° C. 4-keto-7-chloro-1,2,3,4-tetrahydroquinoline with at least about one equivalent of 5-diethylamino-2-aminopentane in the presence of an oxidizing agent.

8. The process for preparing 4-(4'-diethylamino-1'-methylbutylamino) -7- chloroquinoline which comprises heating at a temperature between about 70° C. and 200° C. 4-keto-7-chloro-1,2,3,4-tetrahydroquinoline with at least about one equivalent of 5-diethylamino-2-aminopentane in the presence of nitrobenzene.

9. The process for preparing 4-(4'-diethylamino-1'-methylbutylamino) -7- chloroquinoline which comprises heating at a temperature about 140–160° C. 4-keto-7-chloro-1,2,3,4-tetrahydroquinoline with about two equivalents of 5-diethylamino-2-aminopentane in the presence of phenol and nitrobenzene, the concentration of the 4 - keto - 7 - chloro - 1,2,3,4 - tetrahydroquinoline being greater than about 0.05 gram per milliliter of total solvent.

WILLIAM S. JOHNSON.

References Cited in the file of this patent

Clemo et al., J. Chem. Soc. (London), vol. 125, pp. 1608–1622 (1924).

Johnson et al., J. Am. Chem. Soc., vol. 71, pp. 1901–1905 (1949).